United States Patent [19]
Berstis et al.

[11] Patent Number: 6,092,100
[45] Date of Patent: Jul. 18, 2000

[54] METHOD FOR INTELLIGENTLY RESOLVING ENTRY OF AN INCORRECT UNIFORM RESOURCE LOCATOR (URL)

[75] Inventors: Viktors Berstis; Maria Azua Himmel, both of Austin, Tex.

[73] Assignee: International Business Machines Corporation, Armonk, N.Y.

[21] Appl. No.: 08/976,212

[22] Filed: Nov. 21, 1997

[51] Int. Cl.[7] .................................................. G06F 15/16
[52] U.S. Cl. ......................................... 709/203; 709/227
[58] Field of Search .................................... 709/200, 228, 709/227, 203; 707/3, 5; 395/605

[56] References Cited

U.S. PATENT DOCUMENTS

| | | | |
|---|---|---|---|
| 5,659,732 | 8/1997 | Kirsch | 707/5 |
| 5,802,299 | 9/1998 | Logan et al. | 709/218 |
| 5,920,854 | 8/1999 | Kirsch et al. | 707/3 |
| 5,970,455 | 10/1999 | Wilcox et al. | 704/270 |
| 5,973,665 | 10/1999 | Davie et al. | 345/141 |

OTHER PUBLICATIONS

Hewlett–Packard, Correcting Names, Software Patent Institute, pp 1–3, Sep. 1986.

*Primary Examiner*—Zarni Maung
*Attorney, Agent, or Firm*—Jeffrey S. LaBaw; David H. Judson

[57] ABSTRACT

A Web browser running on a client machine typically includes an address field in which a Uniform Resource Locator (URL) may be entered. The URL identifies a particular server (or file) located at a target Web site. If a given URL is entered incorrectly at the Web client, a fuzzy URL detection scheme automatically performs a fuzzy search that returns a list of URLs that most closely match what was originally entered into the browser address field. The user can then select the correct URL from the list and launch the browser to the desired site, or to a directory or file within that site. If the fuzzy search does not reveal a match, the browser may contact a server dedicated to performing a broader fuzzy search. In another alternative, the browser contacts a Web server and the fuzzy search is implemented at the Web server in order to return a particular file.

24 Claims, 5 Drawing Sheets

| PAIR | STRING LIST WITH OCCURRENCE COUNT |
|---|---|
| .C | WWW.USATODAY.COM * 1, WWW.IBM.COM * 1, WWW.CNN.COM * 2, WWW.YAHOO.COM * 1, |
| .I | WWW.IBM.COM * 1, |
| .M | WWW.IBM.COM * 1, |
| .N | WWW.CNN.COM * 1, |
| .O | WWW.YAHOO.COM * 1, |
| .U | WWW.USATODAY.COM * 1, |
| .W | WWW.USATODAY.COM * 1, WWW.IBM.COM * 1, WWW.CNN.COM * 1, WWW.YAHOO.COM * 1, |
| .Y | WWW.USATODAY.COM * 1, WWW.YAHOO.COM * 1, |
| AD | WWW.USATODAY.COM * 1, |
| AH | WWW.YAHOO.COM * 1, |
| AS | WWW.USATODAY.COM * 1, |
| AT | WWW.USATODAY.COM * 1, |
| AY | WWW.USATODAY.COM * 1, WWW.YAHOO.COM * 1, |
| BI | WWW.IBM.COM * 1, |
| BM | WWW.IBM.COM * 1, |
| CN | WWW.CNN.COM * 1, |
| CO | WWW.USATODAY.COM * 1, WWW.IBM.COM * 1, WWW.CNN.COM * 1, WWW.YAHOO.COM * 1, |
| DO | WWW.USATODAY.COM * 1, |
| HO | WWW.YAHOO.COM * 1, |
| MO | WWW.USATODAY.COM * 1, WWW.IBM.COM * 1, WWW.CNN.COM * 1, WWW.YAHOO.COM * 1, |
| NN | WWW.CNN.COM * 1, |
| OO | WWW.YAHOO.COM * 1, |
| OT | WWW.USATODAY.COM * 1, |
| SU | WWW.USATODAY.COM * 1, |
| WW | WWW.USATODAY.COM * 2, WWW.IBM.COM * 2, WWW.CNN.COM * 2, WWW.YAHOO.COM * 2, |

*FIG. 7A*

| PAIR | COUNT |
|---|---|
| .C | 1 |
| .U | 1 |
| .W | 1 |
| .Y | 1 |
| AD | 1 |
| AS | 1 |
| AT | 1 |
| AY | 1 |
| CO | 1 |
| DT | 1 |
| MO | 1 |
| SU | 1 |
| WW | 2 |

*FIG. 7B*

```
PAIR  OOO  STRINGS
---   ---  -------
.C    1    WWW.USATODAY.COM * 1,  WWW.IBM.COM * 1,  WWW.CNN.COM * 2,  WWW.YAHOO.COM * 1,
.U    1    WWW.USATODAY.COM * 1,
.W    1    WWW.USATODAY.COM * 1,  WWW.IBM.COM * 1,  WWW.CNN.COM * 1,  WWW.YAHOO.COM * 1,
.Y    1    WWW.USATODAY.COM * 1,  WWW.YAHOO.COM * 1,
AD    1    WWW.USATODAY.COM * 1,
AS    1    WWW.USATODAY.COM * 1,
AT    1    WWW.USATODAY.COM * 1,
AY    1    WWW.USATODAY.COM * 1,  WWW.YAHOO.COM * 1,
CO    1    WWW.USATODAY.COM * 1,  WWW.IBM.COM * 1,  WWW.CNN.COM * 1,  WWW.YAHOO.COM * 1,
DT    1
MO    1    WWW.USATODAY.COM * 1,  WWW.IBM.COM * 1,  WWW.CNN.COM * 1,  WWW.YAHOO.COM * 1,
SU    1    WWW.USATODAY.COM * 1,
WW    2    WWW.USATODAY.COM * 2,  WWW.IBM.COM * 2,  WWW.CNN.COM * 2,  WWW.YAHOO.COM * 2,
```

*FIG. 7C*

```
WWW.USATODAY.COM = 13 * 12 = 156
WWW.YAHOO.COM    =  8 *  7 =  56
WWW.CNN.COM      =  7 *  5 =  35
WWW.IBM.COM      =  6 *  5 =  30
```

*FIG. 7D*

```
WWW.USATODAY.COM = (0+0+0+0+0+0+0+0+0+1+0+0+0) +  9 = 10
WWW.YAHOO.COM    = (0+1+0+0+1+1+1+0+0+1+0+0+0) +36 = 41
WWW.IBM.COM      = (0+1+0+1+1+1+1+1+0+1+0+1+0) +64 = 72
WWW.CNN.COM      = (1+1+0+1+1+1+1+1+0+1+0+1+0) +64 = 73
```

*FIG. 8*

METHOD FOR INTELLIGENTLY RESOLVING ENTRY OF AN INCORRECT UNIFORM RESOURCE LOCATOR (URL)

BACKGROUND OF THE INVENTION

1. Technical Field

The present invention relates generally to transactions over computer networks and more particularly to a method for enabling communications between a client and server in the event that a server name has been typed or otherwise entered incorrectly by a user.

2. Description of the Related Art

The World Wide Web is the Internet's multimedia information retrieval system. In the Web environment, client machines effect transactions to Web servers using the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator or Microsoft Internet Explorer) at a client machine involves specification of a link via the URL. In response, the client makes a request to the server (sometimes referred to as a "Web site") identified in the link and, in return, receives in return a document or other object formatted according to HTML.

Typically, a user specifies a given URL manually by typing the desired character string in an address field of the browser. Existing browsers provide some assistance in this regard. In particular, both Netscape Navigator (Version 3.0 and higher) and Microsoft Internet Explorer (Version 3.0 and higher) store URLs that have been previously accessed from the browser during a given time period. Thus, when the user begins entering a URL, the browser performs a "type-ahead" function while the various characters comprising the string are being entered. Thus, for example, if the given URL is "http://www.ibm.com" (and that URL is present in the URL list), the browser parses the initial keystrokes against the stored URL list and provides a visual indication to the user of a "candidate" URL that the browser considers to be a "match". Thus, as the user is entering the URL he or she desires to access, the browser may "look ahead" and pull a candidate URL from the stored list that matches. If the candidate URL is a match, the user need not complete entry of the fully-resolved URL; rather, he or she simply actuates the "enter" key and the browser is launched to the site.

URL resolution through this "look ahead" approach has provided some benefits, but the technique is unsatisfactory because the target URL may not be on the saved list. Alternatively, a portion of the target URL (e.g., the second level domain name) may be saved in the list but the typing error may be a particular directory or file name toward the end of the long string of characters. In either case, the user is forced to enter a long character string, only to find that the string cannot be meaningfully resolved (by a network naming service or a particular Web server, as the case may be). If the URL includes an error, a "server not found" error message or the like is returned to the user.

It would be desirable to provide an improved technique to intelligently resolve an incorrect URL even if the browser has never accessed the target server. This is the problem addressed by the present invention.

SUMMARY OF THE INVENTION

It is thus a primary object of the present invention to implement a "fuzzy" address detection scheme in a client-server computer network such as the Internet's World Wide Web.

It is another primary object of this invention to enable a user of a Web client to specify a vaguely-remembered URL character string and let a fuzzy detection scheme automatically determine the intended domain name.

It is another primary object of this invention to intelligently resolve an incorrect server address (e.g., a URL) in the event that a user errs in entering a target address.

It is still another important object of this invention to resolve a "fuzzy" URL entered at a Web client to facilitate communications between the Web client and a target Web site.

Still another object of this invention is to implement a server-based "fuzzy" URL detection scheme to facilitate intelligent resolution of incorrect URLs entered at a given Web client.

A more particular object of this invention is to provide a fuzzy URL detection scheme from a given Web server domain to intelligently resolve "fuzzy" file requests directed to files within the domain.

Still another aspect of this invention involves distributing the fuzzy URL detection logic across multiple components in the network. Thus, a given client machine includes a fuzzy URL detection engine that tests the URL against a "local" history list. This is useful in the case where even the server IP address portion of the URL (namely, the second level domain name) is not recognized by the browser. If the URL detection engine at the client cannot find a match, the browser may be launched to another server running the fuzzy URL detection engine, preferably against a more broad-based archive of URLs. The server may be located at or associated with an Internet Service Provider (ISP), or it may simply be another task running in the same machine or environment. The fuzzy search performed at the server then returns to the Web client a list of candidate URLs for selection. Further, in the situation where the entered character string includes a correct IP address, the client machine will be connected to the server but there still may be a (directory or file name) error in the URL. Thus, according to the invention, a target Web site also includes a fuzzy detection engine for resolving such errors.

Thus, in the preferred embodiment, a fuzzy detection scheme is implemented across multiple components in the computer network.

Regardless of where the detection engine is supported, the fuzzy search returns a list of URLs that most closely match what was originally entered into the browser address field. The user can then select the correct URL from the list and launch the browser to the desired site, or to a directory or file within that site. Alternatively, the browser may be launched and/or otherwise connected to the particular site and/or directory or file, as the case may be.

In accordance with a more particular object of the invention, a method of detecting a URL includes a number of steps initiated when a user at a Web client enters a URL. If the URL is not fully recognized (at the client, the dedicated ISP server or at a Web server, as the case may be), a fuzzy search is performed against entries of an address table that includes candidate URLs, with each URL hashed into a set of N adjacent letters (with N=2, for example). The fuzzy search returns to the client a list of URLs that most closely match the entered URL. The browser may be launched automatically to a "best" match if the fuzzy search identifies a particular candidate URL with a given level of confidence. Alternatively, or if several candidate URLs are returned, the user may be prompted to select a URL from the list. The browser is then launched to the URL.

The above objects are not limited to resolving incorrect URLs directed to HTTP-compliant Web servers. Generalizing, the principles of the present invention are also useful in resolving incorrect Uniform Resource Identifier (URIs) specifying FTP, SMTP or other Internet Protocol (IP)-based servers.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
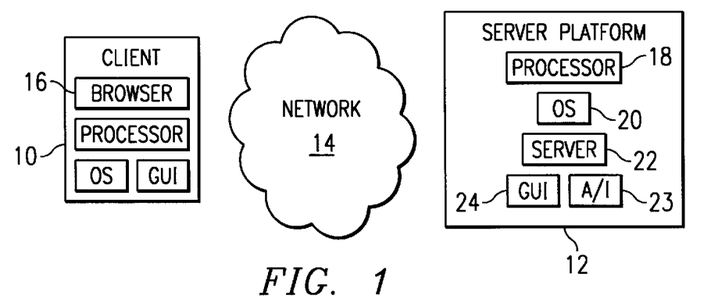
FIG. 1 is a representative system in which the present invention is implemented.

The present invention is preferably implemented in a client-server computer network. Thus, by way of background, a representative Web client/Web server is illustrated in FIG. 1. In particular, a client machine 10 is connected to a Web server platform 12 via a communication channel 14. For illustrative purposes, channel 14 is the Internet, an intranet, an extranet or any other known network connection. Web server platform 12 is one of a plurality of servers which are accessible by clients, one of which is illustrated by machine 10. A representative client machine includes a browser 16, which is a known software tool used to access the servers of the network. The Web server platform (sometimes referred to as a "Web" site) supports files in the form of hypertext documents and objects. The network path to a server is identified by a Uniform Resource Locator (URL), as is well-known. A URL is a specific form of Uniform Resource Identifier (URI), as implemented in the HTTP 1.1 Specification, Internet Engineering Task Force (IETF) RFC xxxx, which is incorporated herein by reference. Although the principles of the present invention are described in the context of a URL fuzzy detection scheme, the invention may be generalized to intelligent resolution of any URI input error from an Internet Protocol (IP) client machine.

A representative Web Server platform 12 comprises an IBM RISC System/6000 computer 18 (a reduced instruction set of so-called RISC-based workstation) running the AIX (Advanced Interactive Executive Version 4.1 and above) Operating System 20 and a Web server program 22, such as Netscape Enterprise Server Version 2.0, that supports interface extensions. The platform 12 also includes a graphical user interface (GUI) 24 for management and administration. The Web server 18 also includes an Application Programming Interface (API) 23 that provides extensions to enable application developers to extend and/or customize the core functionality thereof through software programs commonly referred to as "plug-ins" or helper applications.

A representative Web client is a personal computer that is x86-, PowerPC®- or RISC-based, that includes an operating system such as IBM® OS/2® or Microsoft Windows 95, and that includes a browser, such as Netscape Navigator 3.0 (or higher), having a Java Virtual Machine (JVM) and support for application plug-ins and helper applications.

Figure 2:
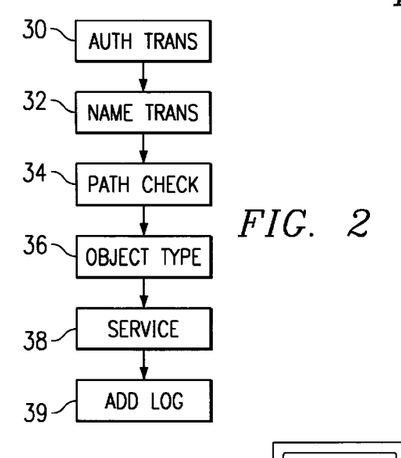
FIG. 2 is a flowchart illustrating the conventional processing associated with an HTTP request from the Web client to the Web server shown in FIG. 1.

As is well-known, the Web server normally accepts a client request and returns a response. The operation of the server program 22 is governed by a number of server application functions (SAFs), each of which is configured to execute in a certain step of a sequence. This sequence, illustrated in FIG. 2, begins with authorization translation (AuthTrans) 30, during which the server translates any authorization information sent by the client into a user and a group. If necessary, the AuthTrans step may decode a message to get the actual client request. At step 32, called name translation (NameTrans), the URL associated with the request may be kept intact or it can be translated into a system-dependent file name, a redirection URL or a mirror site URL. At step 34, called path checks (PathCheck), the server performs various tests on the resulting path to ensure that the given client may retrieve the document. At step 36, sometimes referred to as object types (ObjectType), MIME (Multipurpose Internet Mail Extension) type information (e.g., text/html, image/gif, etc.) for the given document is identified. At step 38, called Service (Service), the Web server routine selects an internal server function to send the result back to the client. This function can run the normal server service routine (to return a file), some other server function (such as a program to return a custom document) or a CGI program. At step 39, called Add Log (AddLog), information about the transaction is recorded.

A Uniform Resource Locator (URL) has the following common syntax:

http://www.name.com/directory/file where "name" is a so-called "second level" domain name. In the above example, the ".com" extension is merely illustrative as other known or future extensions (e.g., .org, .edu, etc.) are or may be used. When a user enters a URL in a browser address field, some portion of the URL may be incorrect. The present invention implements a fuzzy URL detection scheme for "intelligent" resolution of the input error. Preferably, this detection scheme is distributed across multiple components in the computer network including, without limitation, the client from which the URL request originates, an alternative server (e.g., located at an ISP), and at various target Web sites. It is not required that the fuzzy detection scheme be implemented at each of these components, however. As used herein, the URL (or other character string) resolution is said to be "intelligent" because the input errors are addressed or rectified by using a "close" or "best" matching strategy. A preferred "best match" strategy is described below, although any suitable matching algorithm may be implemented.

Figure 3:
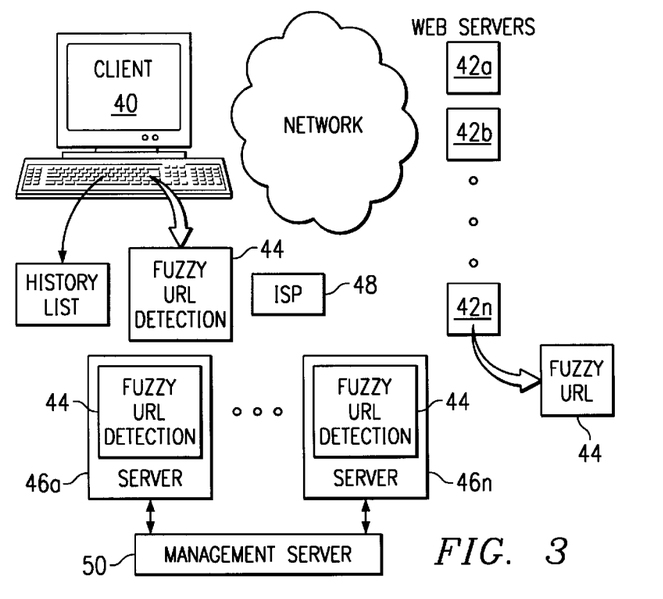
FIG. 3 is a block diagram of a preferred fuzzy URL detection service implementation according to a preferred embodiment of the present invention.

FIG. 3 illustrates how the fuzzy detection scheme may be implemented across multiple components in the computer network. This "distributed" approach is desirable because, as noted above, a given URL error may be present in the domain name portion itself (namely, the IP address) or within the portion of the URL identifying particular directory or file within the domain identified by the (correctly-entered) domain name portion. As seen in FIG. 3, at least one of a plurality of Web clients (each identified by reference numeral 40) is connectable to a plurality of Web servers 42a–42n, each of which support a plurality of related files. The client includes a fuzzy URL detection engine 44 for carrying out the method of the present invention. The computer network also includes one or more dedicated servers 46–46n, each of which may supports its own fuzzy detection engine 44 as well. Thus, for example, dedicated server 46a is associated with Internet Service Provider (ISP) 48. As used herein, however, a so-called "dedicated" server need not be physically remote from any other device or component. Thus, for example, a given "server" having this function may simply be a new task running in an existing machine. A management server 50 may be used to manage the servers 46a–46n, and thus customers may subscribe to a fuzzy detection "service."

In addition to detection engine support at the client and at the server 46, it is preferred that one or more of the Web servers also include the detection engine 44. As is well-known in the art, a set of related files may be supported on a Web server as a so-called "Web site". Supporting a detection engine at a Web site is desirable because, as will be seen, a user of a Web client may enter the domain name correctly (in which case the connection between client and server may be established) but still have erred in entering some other portion of the URL (e.g., a directory or file name). Thus, if the client machine is successful in making some contact with a Web site (in other words, the IP address was entered correctly), the Web site fuzzy detection engine is used.

Figure 4:
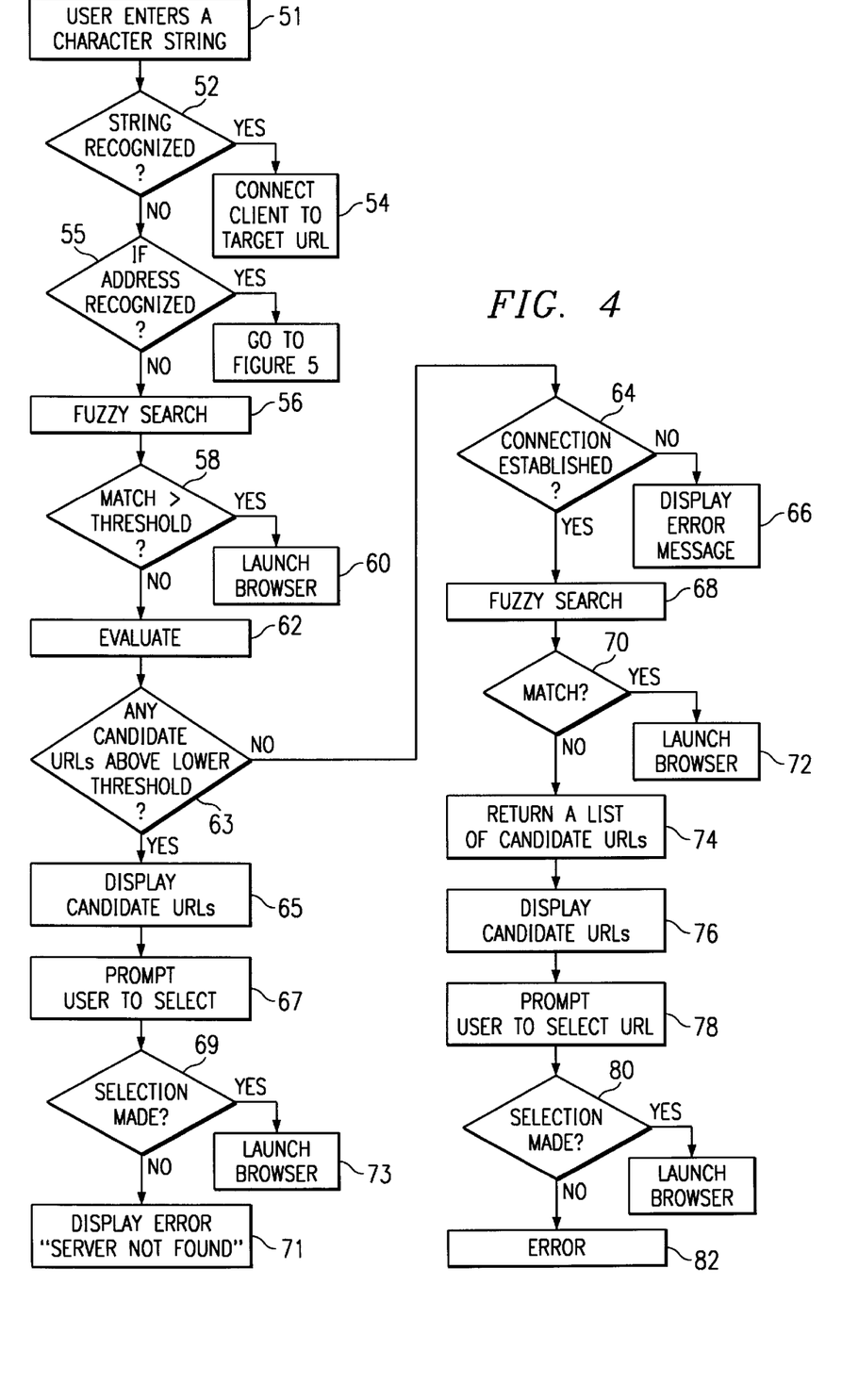
FIG. 4 is a flowchart of a fuzzy URL detection scheme implemented in the service illustrated in FIG. 3.

FIG. 4 is a flowchart of a preferred implementation of the distributed fuzzy URL detection scheme. The routine begins at step 51 when the user enters a character string, preferably in the address field of the Web client browser. At step 52, a test is done to determine whether the string is recognized. If so, the routine continues at step 54 with the client connected to the target server in the usual manner. If, however, the outcome of the test at step 52 indicates that the character string is not recognized, fuzzy detection is required. Preferably, analysis begins with the local URL detection engine.

In particular, a test is done at step 55 to determine whether the IP address portion of the URL is recognized and a connection established. As noted above, the IP address is the second level domain name. If the outcome of the test at step 55 indicates that the IP address has been recognized, then the client machine has made some at least some contact with a target server. The routine continues processing this branch as described in the flowchart of FIG. 5. If, however, the routine indicates that the IP address has not been recognized, processing continues at step 56. At this step, the character string is indexed into a lexicon of server IP names that have been used by the Web client over a given "history" period. The history period may be user-selectable (using a Preferences menu or the like) or the engine may be a default to a given setting (e.g., URLs accessed from the client over the last 30 days). A test is then done at step 58 to determine whether the character string "matches" against any entry in the lexicon with respect to a given confidence level. The confidence level may be user-selectable or a default value. If the outcome of the test at step 58 indicates that the character string "matches" a URL entry in the lexicon by the predetermined threshold, the routine continues at step 60 to launch the browser to the URL.

If, however, the outcome of the test at step 58 indicates that a "match" does not exist (based on the given threshold), then the routine continues at step 62 with an evaluation of the rankings. At this point, a second test is preferably performed using a lower selectable or default threshold. Thus, for example, the best match algorithm may return one or more candidate URL choices that do not meet the threshold (for automatically launching the browser) but (given their ranking value) still are "close" to the character string entered. In such case, it may be desirable to display a subset of candidate URLs that may still include the intended URL. Thus, at step 63, a test is done to determine whether any candidate URLs returned from the fuzzy search satisfy a lower threshold value (which also may be preset or set to a default). If the outcome of the test at step 63 is positive, the routine continues at step 65 to display (in a listbox, for example) those candidate URLs that are ranked over the lower threshold (but below the upper threshold). At step 67, the user is prompted to select one of the displayed URLs. At step 69, a test is performed to determine whether the user has made a selection within a given timeout. If not, an error message is displayed at step 71. Otherwise, the browser is launched to the selected URL at step 73.

If the outcome of the test at step 63 is negative, then the URL must be found elsewhere. In this case, the browser is launched to one of the dedicated servers 46, as discussed above. In the preferred embodiment, a given server 46 supports a much larger database of most-recently used (MRU) URLs against which the fuzzy search may be run.

A test is run at step 64 to determine if the browser has established a connection to the dedicated server 46. If not, the routine continues at step 66 and returns an error message. If, however, the browser has established a connection to the dedicated server, the routine continues at step 68 by running a fuzzy search against the server database. A test is then done at step 70 to determine whether a "match" is found within some degree of confidence. If the outcome of the test at step 70 is positive, the browser is automatically launched to the identified URL at step 72. This may be accomplished by having the dedicated server 46 issue a HTTP 301 redirection request to the browser, using the identified URL. If, however, the outcome of the test at step 70 is negative (because, for example, a match is found but not with a high enough degree of confidence), the routine continues at step 74 to return to the client a list of candidate URLs. At step 76, the candidate URLs are displayed by the browser (using local display resources, such as a listbox or other menu). The user is then prompted at step 78 to select one of the URLs listed. At step 80, a test is performed to determine whether the user has made a selection within a given timeout. If not, an error message is displayed at step 82. Otherwise, the browser is launched to the selected URL at step 84. This completes the processing.

Figure 5:
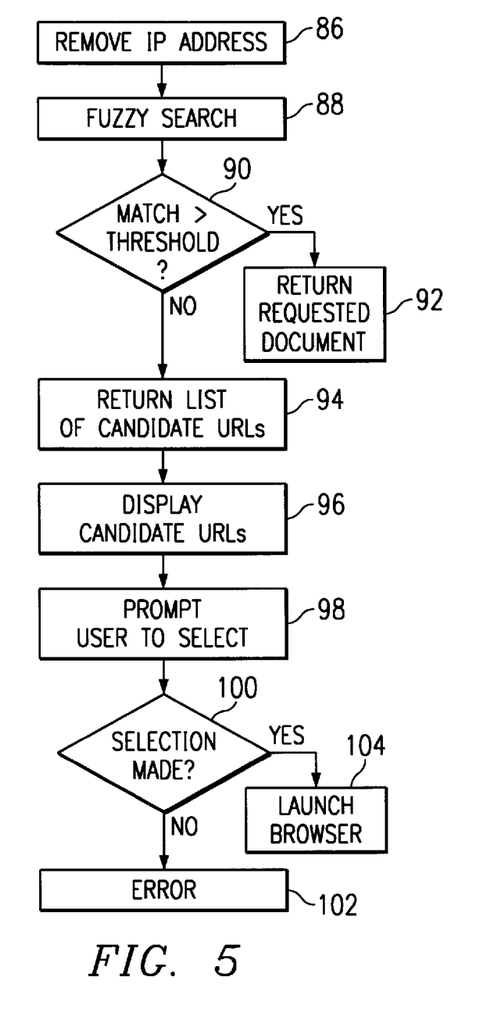
FIG. 5 is a flowchart illustrating the operation the fuzzy URL detection scheme at a Web server.

FIG. 5 illustrates the operation of the fuzzy detection logic at the Web server. As noted above, this routine is reached where the IP address is correctly entered at the Web client but some latter portion of that URL is incorrect or cannot be resolved at the target server. To this end, the routine begins at step 86 by removing all or part of the IP address portion (which has been correctly recognized). The routine then continues at step 88. In particular, the remaining portion of the character string is indexed into a lexicon of directory/file names available in the server. This test may be run against a portion of the available names (e.g., those that have been most recently used (MRU), or those that have been MRU to respond to an HTTP request from this particular client, and so on). This is the fuzzy search. The particular options may be selectable. A test is then done at step 90 to determine whether the character string "matches" against any entry in the lexicon with respect to a given confidence level. The confidence level may be selectable or a default value. If the outcome of the test at step 90 indicates that the character string portion "matches" a directory/file entry in the lexicon by the predetermined threshold, the routine continues at step 92 to return the requested document to the client.

If, however, the outcome of the test at step 90 indicates that a "match" does not exist (based, for example, on the given threshold), then the routine continues at step 94 to return to the client a list of candidate URLs (having the fully-extended directory/file "candidates". At step 96, the candidate URLs are displayed by the browser (using local display resources, such as a listbox or other menu). The user is then prompted at step 98 to select one of the URLs listed. At step 100, a test is performed to determine whether the user has made a selection within a given timeout. If not, an error message is displayed at step 102. Otherwise, the browser is launched to the selected URL at step 104. This completes the processing.

Figure 6:
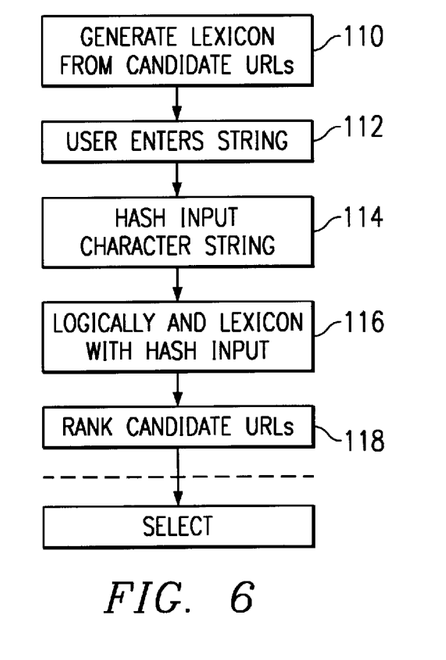
FIG. 6 is a flowchart illustrating one matching algorithm for use in identifying a best match between an entered string and a given lexicon.

One simple matching algorithm is a "best match" technique illustrated in the flowchart of FIG. 6. For purposes of discussion, this technique is described with respect to the client-based URL detection scheme, although a similar (or alternative) methodology is implemented in the server 46 and/or Web server-based versions. In this example, the history list (namely, the candidate URLs) include the following: www.usatoday.com, www.ibm.com, www.cnn.com and www.yahoo.com. The routine begins at step 110 to generate the lexicon against which the fuzzy URL search is performed. This step is generally performed "off-line" automatically (and not necessarily when the character string is entered). At step 110, each candidate URL is hashed into a set of N adjacent characters (irrespective of ordering) as illustrated, by way of example only, in FIG. 7A. In this example, each URL has been hashed or decomposed into its constituent unordered "pairs" with the pairs then ordered alphabetically. Thus, for example, the pair ".c" appears once in www.usatoday.com, once in www.ibm.com, twice in www.cnn.com, and once in www.yahoo.com. Each entry of the lexicon is preferably organized in this manner.

At step 112, the user enters the target URL. For purposes of illustration, it is assumed that the user desires to navigate to www.usatoday.com but mistakenly types www.usatday-.com. The routine then continues at step 114 to hash the input URL into a hash table as illustrated in FIG. 7B. The routine then continues at step 116 to intersect (through a logical AND operation) the lexicon (in FIG. 7A) with the hash table (in FIG. 7B). The result of step 116 is illustrated in FIG. 7C. At step 118, the routine then ranks the candidate URLs. In particular, step 118 preferably involves multiplying the number of occurrences of the candidate URL times the number of pairs in which the candidate URL appears. Thus, for example, www.usatoday.com occurs thirteen (13) times overall and is present in twelve (12) of the pairs comprising the table in FIG. 7C. Thus, www.usatoday.com receives a ranking of 156. The next best candidate URL, www.yahoo.com, occurs eight (8) times overall and is present in seven (7) of the pairs, for a ranking of 56. FIG. 7D illustrates the ranking table, with all four (4) candidate URLs identified. The candidate URL with the "highest" score is then selected as the match. This completes one type of best match algorithm that may be used.

Thus, considering this example, the fuzzy URL search would automatically launch the browser to www.usatoday-.com (if the 156 ranking satisfies the threshold set in step 58 in FIG. 4). Alternatively, the candidate URL rankings are displayed to facilitate user selection. Presumably, the user would then select www.usatoday.com given that this URL has the highest ranking.

Figure 7A:
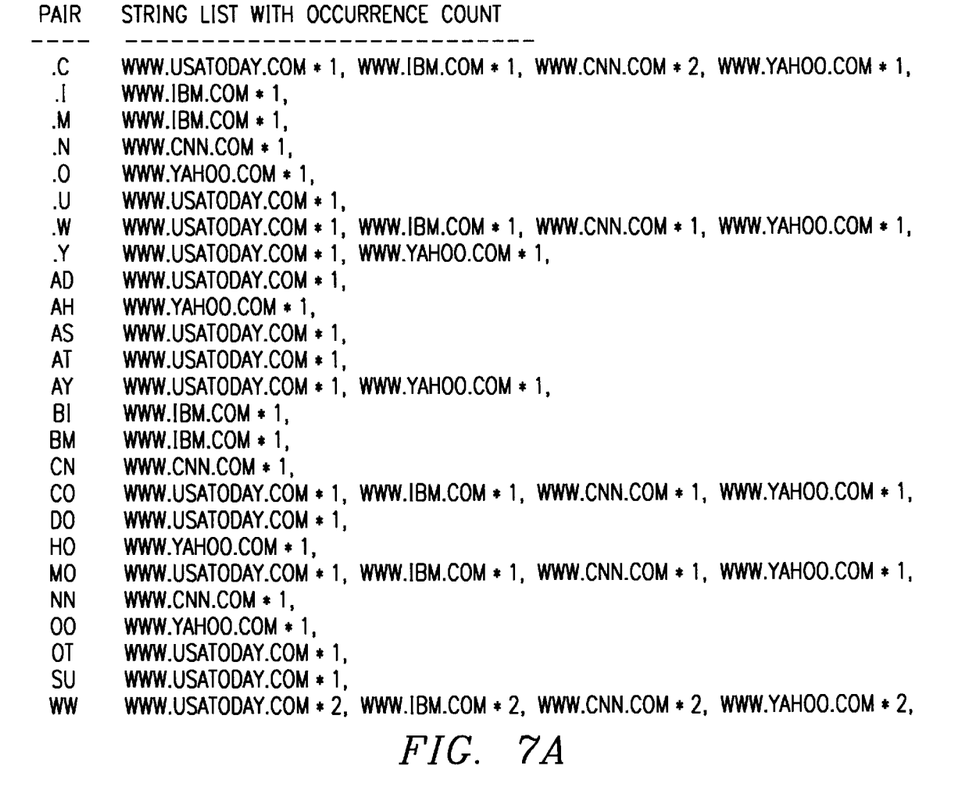
FIG. 7A–7D illustrate a representative example of the operation of the matching algorithm.
Figure 7B:
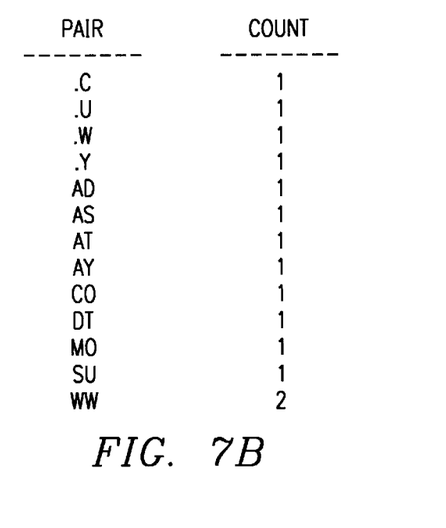
Figure 7C:
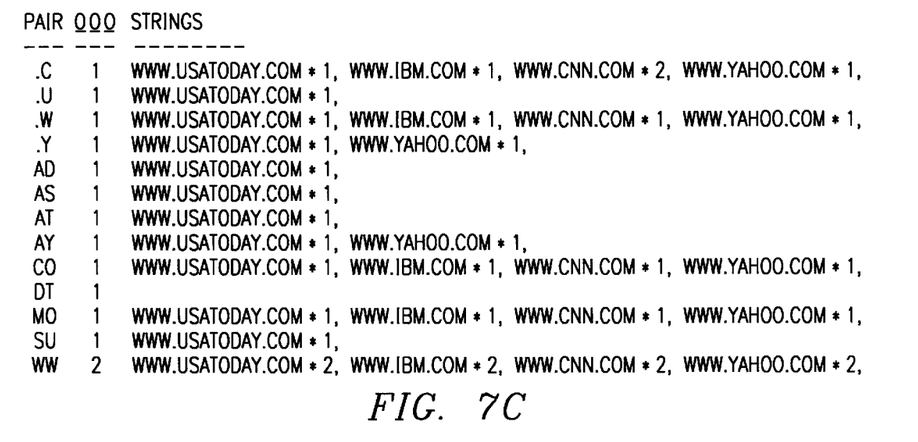
Figure 7D:
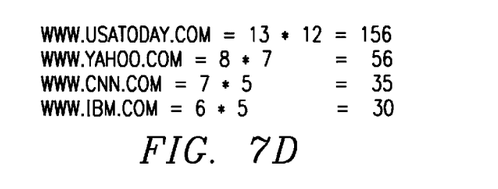
Figure 8:
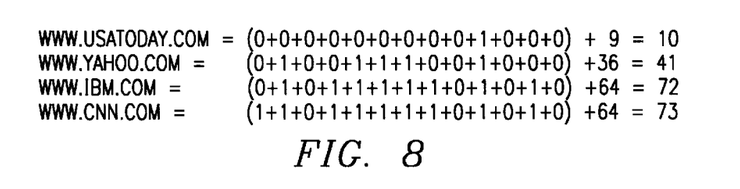
FIG. 8 illustrates how a modified version of the matching algorithm may be used to select a given candidate URL.

An alternative best match algorithm, which is preferred, uses the same three (3) tables illustrated in FIGS. 7A–7C but processes the scores in a manner to force the selection of a URL with a given "low" ranking. In this example, the strings are "scored" by squaring the differences between the QQQ values (those given by the incorrectly typed string) in FIG. 7C and summing the squares together. Preferably, the sums are then increased by the square of the number of pairs lists from which the two strings are both absent. These values are then ranked lowest to highest. For example, www.usatoday.com matches QQQ for all pairs except pair "dt" so the difference is zero for all of the pairs items except "dt", where it is "1" (1–0), which, when squared, still yields 1. Because www.usatoday.com is in the "do" and "ot" pairs lists, but the string in question is not, and because the string in question is in pair list "dt" and www.usatoday.com is not, the sum of the squares is augmented by (2+1) squared, or 9. Similar computations are performed for the other candidate URLs, resulting in the table illustrated in FIG. 8. The "suggestion" for correction would then be www.usatoday.com, which (with the lowest value) is at the top of the list. Other possibilities could be proposed to the user if their scores were close to the "low" value (in this illustrative example).

When the string in question is short and possibly many close hits are found, the algorithm can be run with ordered pairs instead of unordered pairs. Further, the similar entries can be sorted by other factors such as popularity of the given string. Also, if the database becomes very large, it is useful to use "triples" of characters (unordered and ordered) and so forth, as needed, to ensure that the scheme remains robust. Typically, the "pair" approach described above is sufficient at the client, although the 3-tuple or "higher" approach may be more useful at the server (where there is a much larger database of entries). Of course, other suitable best match algorithms may be used.

The present invention provides numerous advantages. Existing Web client-based "look ahead" approaches cannot recognize URLs that are not "close" to URLs previously visited. Because the Web constantly changes, the use of such "local" lists to resolve misspelled URLs does not provide suitable results. Using the present invention, a user can specify a vaguely-remembered character string and let the system automatically determine the intended domain name. The method and system thus resolve an incorrect character string into an electronic address known to the computer network. Preferably, if a URL is entered at a Web client incorrectly, the system automatically performs a fuzzy search that returns a list of URLs that most closely match what was originally entered into the browser address field. The user can then select the correct URL from the list and launch the browser to the desired site or file within that site. The disclosed method and system thus recognizes user-specified server names that are misspelled and provides a mechanism for connecting the client to the server irrespective of that error.

The above-described functionality is preferably implemented across the client, a given target server, or in a server supported at or associated with an Internet Service Provider (ISP) or other computer network device or system. Generalizing, the software is simply a computer program product implemented in a computer-readable medium or otherwise downloaded to the client, server or other device over the computer network. With respect to the client piece, the functionality may be built into the browser, or is implemented as a browser plug-in or helper application. Alternatively, the functionality may be implemented as a Java applet or application.

The "fuzzy" URL scheme, of course, may be generalized for any Uniform Resource Identifier ("URI"), of which the URL is a special case. Thus, the present invention may be used in other Internet services including, without limitation, file transfer (using the file transfer protocol (FTP)), point-to-point messaging or e-mail (using the simple message transport protocol (SMTP), and the like.

In the preferred embodiment, "entry" of a URL is typically accomplished using a keyboard associated with the client machine. This is not a limitation of the present invention, however. The particular manner by which the incorrect URL is entered is not a limitation of the invention. Thus, for example, a URL may be entered by other than keyboard entry (e.g., voice commands or by a suitable speech recognizer).

One of the preferred implementations of invention is thus as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, as used herein, "Web client" should be broadly construed to mean any computer or component thereof directly or indirectly connected or connectable in any known or later-developed manner to a computer network, such as the Internet. The term "Web server" should also be broadly construed to mean a computer, computer platform, an adjunct to a computer or platform, or any component thereof. Of course, a "client" should be broadly construed to mean one who requests or gets the file, and "server" is the entity which downloads the file. As previously discussed, the features of the invention may be implemented in any IP client, and not just a HTTP-compliant Web client running a Web browser.

Having thus described our invention, what we claim as new and desire to secure by Letters Patent is set forth in the following claims.

What is claimed is:

1. A method of intelligently resolving an unrecognized character string entered at an IP client connectable to a plurality of IP servers in a computer network, each of the IP servers having an IP address, comprising the steps of:

responsive to entry of the unrecognized character string at the IP client, performing a fuzzy search of the unrecognized character string against a lexicon of the IP server addresses;

returning a list of IP server addresses that most closely match the unrecognized character string; and connecting the IP client to an IP server identified by one of the IP server addresses in the list.

2. The method as described in claim 1 wherein the computer network is the Internet, the IP client is an HTTP-complaint Web client having a Web browser, and at least one IP server address is associated with a Uniform Resource Locator (URL).

3. The method as described in claim 1 wherein the lexicon includes a table of entries, each entry comprising a set of one or more of the IP addresses having a given character pair.

4. The method as described in claim 3 wherein the fuzzy search logically ANDs the table of entries with a hashed version of the unrecognized character string.

5. The method as described in claim 1 further including the steps of:

displaying the list of IP server addresses to a user of the IP client; and prompting the user of the IP client to select a given one of the IP server addresses in the list, wherein the selected IP server address is used in the connecting step.

6. The method as described in claim 1 wherein the fuzzy search is performed at the client.

7. The method as described in claim 1 wherein the fuzzy search is performed at a server in the computer network.

8. The method as described in claim 1 wherein the IP server address is associated with a Uniform Resource Identifier (URI).

9. A method of intelligently resolving a character string entered at a Web client connectable to a plurality of Web servers in a computer network, each of the Web servers associated with a Uniform Resource Locator (URL), comprising the steps of:

responsive to entry of a character string at the Web client, performing a fuzzy search of the character string against a lexicon of the Web server URLs;

returning a list of URLs that most closely match the character string;

displaying the list of URLs to a user of the Web client; and prompting a user of the Web client to select a given one of the URLs in the list.

10. The method as described in claim 9 further including the step of:

connecting the Web client to Web server identified by the selected URL.

11. The method as described in claim 9 wherein the lexicon includes a table of entries, each entry comprising a set of one or more of the URLs having a given character pair.

12. The method as described in claim 11 wherein the fuzzy search logically ANDs the table of entries with a hashed version of the character string.

13. The method as described in claim 9 wherein the character string is entered in a browser address field of the Web client.

14. A method of resolving a character string entered at a Web client connectable to a plurality of Web servers in a computer network, the Web client having a browser, and each of the Web servers associated with a Uniform Resource Locator (URL), comprising the steps of:

responsive to entry of a character string, performing a fuzzy search of the character string against a first subset of Web server URLs stored at the Web client;

if the character string meets a given criteria, launching the browser to a given Web server; and if the character string does not meet the given criteria, taking a predetermined action to resolve the character string into a URL.

15. The method as described in claim 14 wherein the predetermined action includes the steps of:

displaying to a user a list of candidate URLs;

prompting the user to select a URL from the list; and launching the browser to a Web server identified by the selected URL.

16. The method as described in claim 14 wherein the predetermined action includes the steps of:

launching the browser to a server located in the computer network; and performing a fuzzy search of the character string against a second subset of Web server URLs stored at the server.

17. The method as described in claim 16 further including the steps of:

returning a list of candidate URLs from the server to the client;

displaying the list of candidate URLs;

prompting the user to select a URL from the list; and launching the browser to a Web server identified by the selected URL.

18. A method of resolving a character string entered at a Web client connectable to a plurality of Web servers in a computer network, the Web client having a browser, and each of the Web servers associated with a Uniform Resource Locator (URL), comprising the steps of:

responsive to entry of a character string, performing a fuzzy search of the character string against a set of Web server URLs stored at the Web client;

if the character string includes a given domain name portion that is recognized as being part of one of the Web server URLs stored at the Web client, launching the browser to the Web server identified by the given domain name; and taking a predetermined action at the Web server to fully resolve the character string.

19. The method as described in claim 18 wherein the predetermined action includes the steps of:

performing a fuzzy search of a portion of the character string against a set of files stored at the Web server;

returning to the client a file that most closely matches against the portion of the character string.

20. A computer program product in a computer readable medium for use in a Web client for resolving a character string entered at a Web browser running on the Web client, comprising:

means responsive to entry of a character string at the Web client for performing a fuzzy search of the character string against a lexicon of Web server URLs stored at the Web client;

means responsive to the fuzzy search for returning a list of URLs that most closely match the character string; and means responsive to display of the list of URLs for prompting a user of the Web client to select a given one of the URLs in the list.

21. The computer program product as described in claim 20 wherein the lexicon includes a table of entries, each entry comprising a set of one or more of the URLs having a given character pair.

22. The computer program product as described in claim 21 wherein the fuzzy search logically ANDs the table of entries with a hashed version of the character string to generate the list of URLs.

23. A computer program product in a computer readable medium for use in a Web client for resolving a character string entered at a Web browser running on the Web client, comprising:

means responsive to entry of a character string at the Web client for determining whether the character string includes a domain name portion recognized as being part of one of the Web server URLs stored at the Web client; and means responsive to the determining means for launching the browser to the Web server identified by the given domain name to facilitate a fuzzy search of a remaining portion of the character string.

24. A computer program product in a computer readable medium for use in a Web server for resolving at least a portion of a character string entered at a Web browser running on a Web client connectable to the Web server, comprising:

means for performing a fuzzy search of the character string portion against a lexicon of files stored at the Web server; and means responsive to the fuzzy search for returning a file that most closely matches the character string portion.

* * * * *